Dec. 18, 1962  G. DION  3,068,691
MEANS FOR MEASURING SPEED AND THE LIKE DATA
IN FLUIDS ASSUMING A RELATIVE MOVEMENT
Filed June 11, 1956  5 Sheets-Sheet 2

INVENTOR
Georges Dion
By Bailey Stephens & Huettig
Attorneys

Dec. 18, 1962 G. DION 3,068,691
MEANS FOR MEASURING SPEED AND THE LIKE DATA
IN FLUIDS ASSUMING A RELATIVE MOVEMENT
Filed June 11, 1956 5 Sheets-Sheet 3
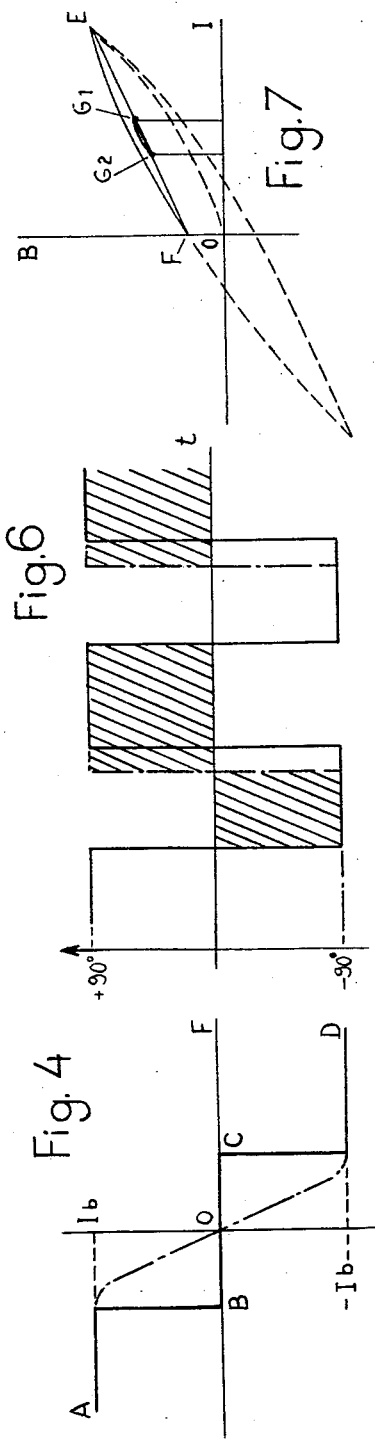
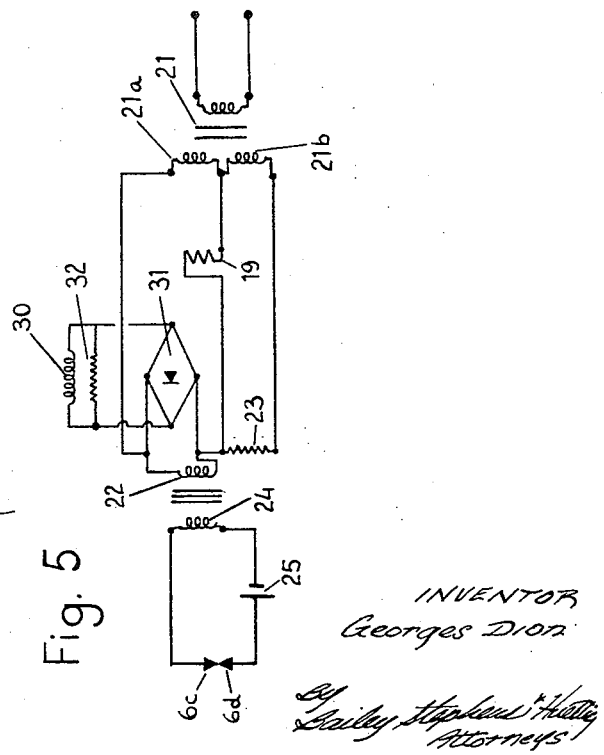
INVENTOR
Georges Dion
BY Bailey, Stephens & Huettig
Attorneys

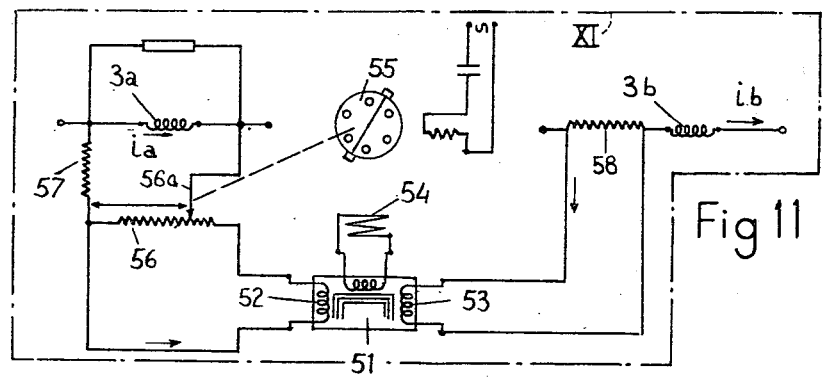
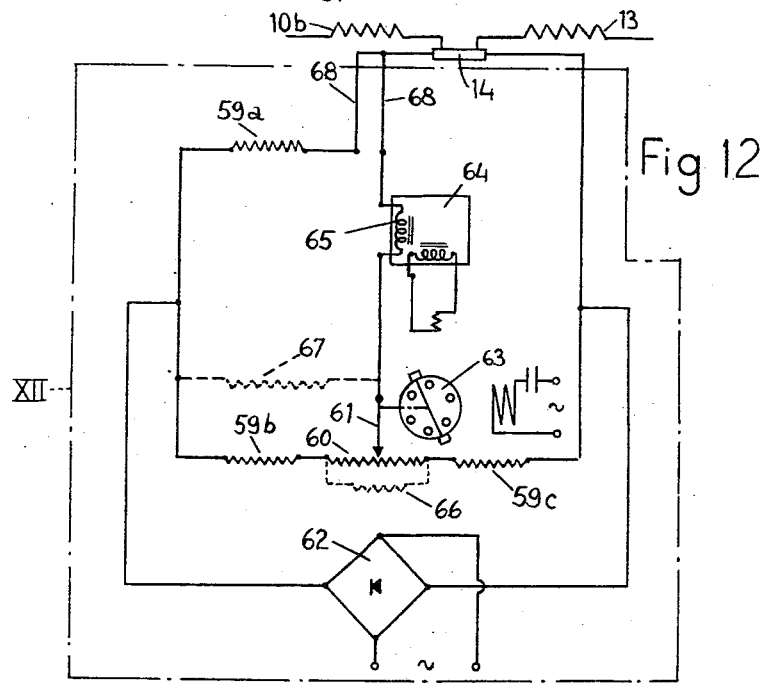
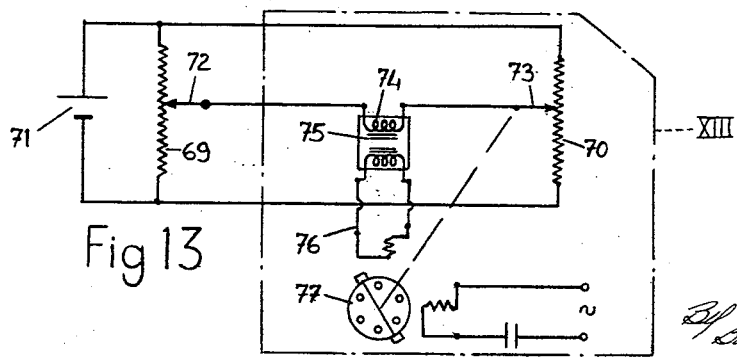

3,068,691
MEANS FOR MEASURING SPEED AND THE LIKE DATA IN FLUIDS ASSUMING A RELATIVE MOVEMENT
Georges Dion, Villebon-sur-Yvette, France, assignor to Les Laboratoires de Physique Appliquee-L.E.G.P.A., Paris, France, a French joint-stock company
Filed June 11, 1956, Ser. No. 590,482
Claims priority, application France June 13, 1955
6 Claims. (Cl. 73—182)

My invention has for its object means for measuring data, and especially the true air speed of a flying aircraft.

It has more particularly for its object, although this is not exclusive, the apparatus and arrangements which allow defining the four following magnitude: the true air speed, the aerodynamic speed, the Mach number and the stagnation temperature.

It is a well known fact that the true air speed is the speed of the aircraft with reference to the mass of air in which it moves; the aerodynamic speed is that which would be assumed by the aircraft under otherwise similar conditions if the aircraft were to fly in an atmosphere under predetermined standard pressure and temperature conditions, while the Mach number is the ratio between the true air speed of the aircraft and the speed of sound at the point of space with which the aircraft registers at the moment considered; and finally the stagnation temperature is the actual temperature prevailing on the leading edge of the aircraft.

It is also a well known fact that these four magnitudes are generally ascertained on board modern aircrafts, chiefly military aircrafts, with a view mainly to giving the pilot general information as to piloting and flying and also to using said magnitudes in various apparatus, such as an automatic pilot, sights and the like. In the practical use of such apparatus, it is of advantage to resort to the possibilities afforded by remote transmission or indicator systems for the measured results obtained after transformation as required for any particular application.

My invention has chiefly for its object to modify measuring apparatus of a prior type so as to satisfy better than hitherto, various requirements of practice, chiefly as concerns the obtention of the following simultaneous properties: accuracy within large speed ranges, rigid structure, possibility of execution with a small bulk and a low weight, easy transformation of the data according to any linear or the like law and adaptability to remote transmission.

It consists chiefly in constituting the data measuring apparatus to be used in a fluid assuming a relative speed, and chiefly on board aircrafts, for measuring speeds with a view to transforming into intensities of current the values of the outer data such as static pressure and/or dynamic pressure while the value of another parameter such as temperature is transformed into an electric resistance value incorporated with the circuits fed by said current intensities and finally to causing at least one current controlled by said intensities to act on an equilibrating member constituted say by a potentiometer and acting in its turn on means inside which a fluid pressure opposes electromagnetic or electrodynamic forces, said equilibrating member being held in or returned into its position of equilibrium by an electric motor which is started automatically whenever a lack of balance appears.

According to a further object of my invention, I produce a combined apparatus giving out the four said parameters of the flight of an aircraft: true air speed, aerodynamic speed, Mach number and stagnation temperature of an aircraft by forming as the actual core of the apparatus, an elementary apparatus giving out only the true air speed of the aircraft.

According to a further object of my invention, an electric indicating apparatus is provided for the above mentioned measures, the indications of said apparatus corresponding to the values of the square root of the quotient of the dynamic pressure by the static pressure.

In order to cut out the effects of hysteresis in the ferro-magnetic circuit serving in such an apparatus, there is introduced in the magnetizing circuit a break during a short time, at the beginning of each period corresponding to a change in the main magnetizing current.

A further object of my invention consists in the provision of a mathematical transformation, i.e. a physical or mathematical transformation in an apparatus of the novel type referred to, said mathematical transformation being advantageously obtained through the potentiometer forming the equilibrating means and being possibly repeated by a remote transmission potentiometer, in a manner such that the travel of the sliders on said potentiometers is defined by a suitable law, say a linear law, as a function of the parameters measured by the apparatus.

A still further object of my invention consists in associating the apparatus provided with a controlled balancing potentiometer and means for securing the movable part of said potentiometer with at least one other homologous potentiometer adapted to produce for instance a repetition or a remote transmission controlled by the position of the balancing potentiometer slider.

My invention covers more particularly the embodiments and applications illustrated in the accompanying drawings and it covers in fact, generally speaking, by way of novel articles of manufacture, all apparatus and arrangements of the type considered incorporating the above mentioned features together with the parts intended for their execution and also the aircrafts provided with the apparatus disclosed, as claimed in the accompanying claims.

I will now describe with further detail my invention, reference being made to the accompanying drawings, wherein:

FIG. 4 is a graph showing the operation of the elementary control arrangement according to FIG. 3.

FIG. 5 is an electric wiring diagram of an improvement brought to this last arrangement, while FIG. 6 is a graph correponding to FIG. 4 incorporating last mentioned improvement.

FIG. 7 is a graph showing a hysteresis cycle together with a general solution for solving the problem relating to hysteresis in the execution of my invention.

FIG. 8 is a diagrammatic showing of a solution brought to this problem, in association with a section of diagrammatic FIG. 3.

FIG. 9 is a highly diagrammatic showing of an arrangement forming one of the sections of FIG. 1, which allows ascertaining the values of aerodynamic speeds starting from the diagram of the true air speed indicator according to FIG. 2 while

FIG. 11 is a diagram of an arrangement forming one of the sections of FIG. 1 and providing an indication of the Mach number starting from the diagram of the true air speed indicator of FIG. 2.

FIG. 12 is a diagram of an arrangement for measuring the stagnation temperature according to my invention, said arrangement forming also one of the sections of FIG. 1.

Figure 1:
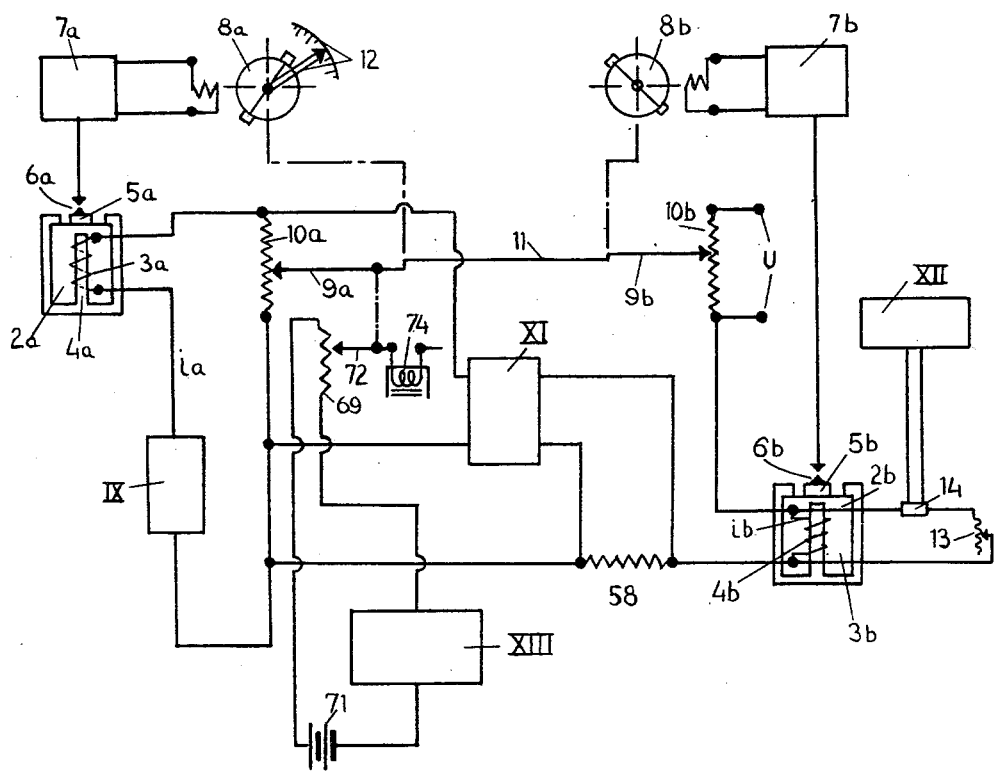
FIG. 1 is a general diagram of a measuring apparatus according to my invention, said diagram illustrating by means of blocks the locations of the detail diagrams of the following diagrammatic FIGS. 2, 3 and 5 to 13.

Lastly, FIG. 13 is a diagram of a remote electric transmission means for any of the elements measured or ascertained in conformity with my invention, said transmission means also forming a section of FIG. 1.

It should be understood furthermore that these drawings and the corresponding parts of the description are given by way of a mere exemplification and by no means in a limiting sense.

I will first describe more specifically with reference to FIGS. 2 to 8 an embodiment of an anemometer indicating the true air speed, said anemometer forming a section of an arrangement according to my invention and executed in conformity with the latter. I will then disclose with reference to FIGS. 9 to 13 how it is possible to execute further sections of the arrangement in association with the basic features incorporated with the apparatus and arrangements illustrated in said FIGS. 2 to 8. In the general diagram illustrated in FIG. 1, the parts 2a to 10a, 2b to 10b and 11 to 14 are those which will be described with further detail hereinafter with reference to FIGS. 2 and 3 while the block or section IX is illustrated in further detail at IXa in FIG. 9 or as a modification at IXb in FIG. 10 while the blocks XI, XII, XIII are those described with further detail in FIGS. 11, 12 and 13.

Turning to the general diagram of FIG. 2, it shows in a conventional manner two apparatus 2a and 2b collecting pressures and the constitution of which will be described hereinafter with further detail with reference to FIG. 3. The apparatus 2a collects the dynamic pressure while the apparatus 2b collects the static pressure. The diaphragm in each of said collectors is subjected on the one hand to the differential action of the corresponding fluid pressure and on the other hand to an electromagnetic force. The latter is produced by a current $i_a$ or $i_b$ passing through a winding 3a or 3b fitted on one of the arms of a magnetic circuit 4a or 4b provided in the corresponding pressure collector. Said electromagnetic force is exerted on a ferromagnetic member 5a or 5b carried by the diaphragm which in other embodiments may however be merely connected therewith and each of said ferromagnetic members is connected with the movable contact piece of an electric switch 6a—6b the other contact piece of which is associated with a bridge 7a—7b which will also be described with further detail with reference to the part 7 illustrated in FIG. 3, together with other parts ot be described briefly hereinafter.

The bridge 7a or 7b controls a motor 8a (or 8b) which drives the slider 9a or 9b of a potentiometer 10a or 10b. The two potentiometer sliders 9a—9b are electrically interconnected as shown at 11 and the potentiometer 10b is fed by a supply of regulated D.C. voltage U. This voltage U may be obtained through the rectifying of an A.C. voltage for instance of 115 v. at a periodicity of 400 cycles.

As mentioned hereinafter, the system including the pressure collector 2a, the bridge 7a, the motor 8a and the potentiometer 9a—10a forms a controlled system wherein equilibrium may be obtained, possibly through an averaging, for each pressure measured by the pressure collector, in a well defined position of the slider 9a. It will also be shown that an indicator 12 connected with the motor 8a may show the true air speed of the aircraft carrying the pressure collectors 2a and 2b.

The diagram includes also an arrangement for temperature corrections which is advantageously connected with an arrangement for measuring the stagnation temperature; said correcting arrangement includes a variable resistance 13 inserted shuntwise with reference to the winding 3b and in series with a temperature gauging rod 14.

Under such conditions, each control system of the type described is executed in a manner such that the current $i_a$ or $i_b$ in the winding 3a or 3b is proportional to the square root of the pressure acting on the corresponding pressure collector. I will disclose hereinafter with reference to FIG. 3 the manner of obtaining such a result. Thus, the intensities are:

(A) $\qquad i_a = k\sqrt{Pd}$ (B) $\qquad i_b = k'\sqrt{ps}$ $Pd$ being the dynamic pressure and $ps$ the static pressure.

It is easy to show that if K is the angular coefficient of the potentiometer 9a, i.e. the ratio between the angular spacing of the potentiometer at the start and the maximum angular spacing to be assumed by the latter, I obtain, through division of the two parts of the above equalities (A) and (B)

(C) $\qquad K = \dfrac{k}{k'} m \sqrt{\dfrac{Pd}{ps}}$ $m$ being a constant factor depending on the resistance of the magnetizing winding 3a, on the value of the resistance 13 and on the values of the resistances 10a and 10b.

On the other hand, the true air speed V of the aircraft is a function of the following type:

(D) $\qquad V = n\sqrt{\dfrac{Pd}{ps}}\sqrt{T_0}$ $n$ being a constant factor and $T_0$ the stagnation temperature.

This formula illustrates symbolically the so-called de Saint-Venant's equation in the case of subsonic speeds and the so-called Lord Rayleigh's equation in the case of supersonic speeds.

The stagnation temperature $T_0$ referred to hereinabove is incorporated in the apparatus through a formula of the type (E) $\qquad \sqrt{T_0} = n'\dfrac{r}{r+R'}$ wherein $n'$ is a constant factor while $r$ is the value of the unvarying resistance of the gauging rod 14 and $R'$ the value of the adjustable resistance 13.

In all cases, the above Equations D and E show that the location of the slider 9a and consequently that of the indicator 12 correspond to the true air speed which it is desired to measure provided however that the different electrical and mechanical parts of the apparatus are correctly sized and provided also the Expression E is suitably complied with, which leads to provide a temperature-sensitive correcting device to be disclosed hereinafter.

Having thus described with reference to FIG. 2 the general structure of an apparatus for measuring the true air speed of an aircraft according to my invention, I will now describe with further detail the different parts of the apparatus. I will begin with the means for measuring the pressure in the apparatus, taking into account various considerations relating to the following problems: balancing of the forces, control of the balance, linearity of said control, anti-hysteresis arrangement and correction of the characteristic of the pressure measures. I will finally give, to finish with the instrument measuring true air speeds, short comments relating to the correction corresponding to stagnation temperature.

As far as the measure of pressures is concerned and in accordance with one of the important features of my invention, I balance the force generated on an elastic diaphragm by a suitable differential pressure by means of an electromagnetic force acting on a ferromagnetic member connected with said diaphragm or rigid with the latter.

Figure 3:
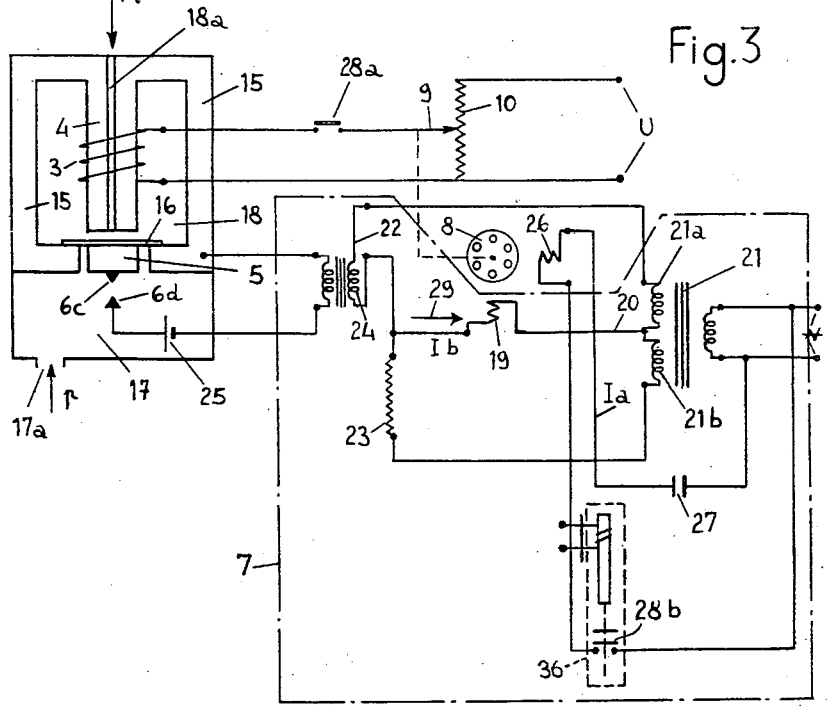
FIG. 3 is a more detailed diagram showing an arrangement for the practical control of a balance between a fluid pressure and forces of an electromagnetic origin.

I have illustrated in FIG. 3 with more detail than in

Figure 2:
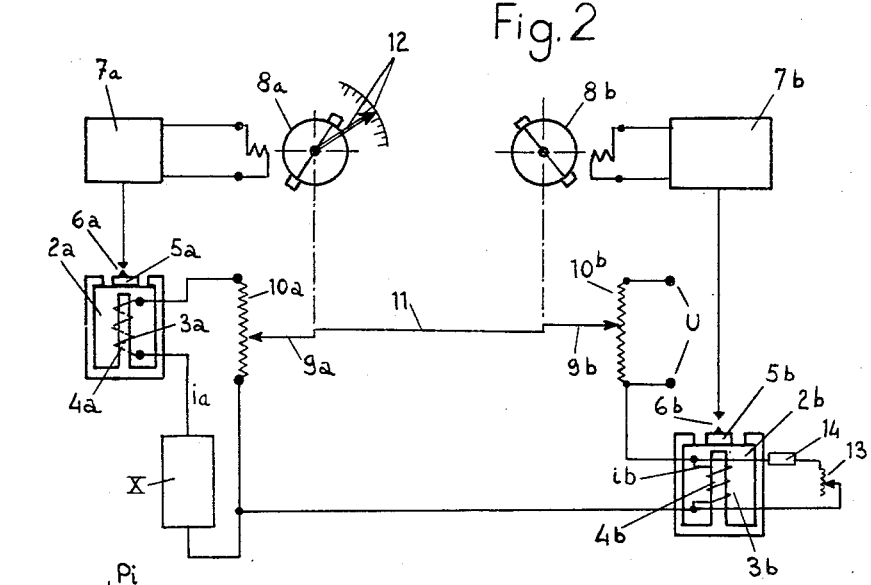
FIG. 2 is a highly diagrammatic showing of an anemometer giving out the true air speed in accordance with my invention and forming one of the sections of FIG. 1.

FIG. 2 a collector 2 for pressures designed so as to form either of the pressure collectors 2a or 2b of FIG. 2. Said collector is in the shape of an electromagnet including a winding 3 surrounding a magnetic core 4 while the magnetic circuit is closed over a cylindrical body 15 surrounding the core 4 and in the terminal gap of which is inserted a ferromagnetic member 5 forming a sort of movable armature for the electromagnet. This armature is rigid with the elastic diaphragm 16, which latter separates two chambers 17 and 18 subjected to different pressures.

When measuring dynamic pressures Pd as in the case of the collector 2a in FIG. 2, the chamber 17 outside the magnetic circuit is subjected through its opening 17a to the static pressure ps while the chamber 18 inside the magnetic circuit is subjected through the channel 18a extending longitudinally through the core 4 to the impact pressure Pi exerted on the aircraft.

When measuring the static pressure ps as in the case of the collector 2b of FIG. 2, the chamber 17 is subjected through its opening 17a to a suitable vacuum while the static pressure acts through the channel 18a inside the chamber 18.

The intensity of the current feeding the magnetizing coil 3 is adjusted through the slider 9 of the potentiometer 10 which is fed through a stabilized D.C. current supply U.

Under such conditions, it may be proved that if the magnetic circuit is not saturated and if the effects of the hysteresis are cut out, the current $i$ corresponding to the balance of the forces applied to the diaphragm is $$i = k'\sqrt{ps}$$

in the case of the measure of static pressures ps and $$i = k\sqrt{Pd}$$

in the case of the measure of dynamic pressures Pd.

It will now disclose a preferred embodiment of my invention for the execution of a controlled electromagnetic equilibrium of the elastic diaphragm.

According to this embodiment, the control is operated through a contact-piece 6c connected with the ferromagnetic member 5 and inserted directly or otherwise in one of the circuits 7 serving for feeding, controlling or energizing the motor 8 associated with the slider 9. The engagement between the movable contact-piece 6c and the cooperating stationary contact-piece 6d provides for the rotation of the motor in either direction, according as to whether the switch 6c—6d is opened or closed. A suitable speed reducer is furthermore inserted between the motor and the slider. On the other hand, in the case illustrated, the movable contact-piece 6c is directly mounted on the ferromagnetic member 5 and moves consequently in unison with the diaphragm 16.

The current $i$ the intensity of which depends on the position of the slider, acts so as to restore equilibrium between the forces acting on the diaphragm and consequently provides for maintaining as an average the motor and the associated slider in a stationary position.

It is of advantage to use as a motor 8 a two-phase repulsion motor. It is a well-known fact that the torque in such motors depends on the phase shifting existing between the currents flowing respectively in the control winding and in the energizing winding, said torque being at a maximum when the phase shifting approximates 90° and being reversed and reversing the direction of operation of the motor when the phase shifting is reversed.

The arrangement 7 (corresponding to the bridge 7a or 7b in FIG. 2) which is provided as shown in FIG. 3 for the execution of such a phase-reversal is as follows: the winding 19 controlling the motor 8 is inserted in the diagonal 20 of a bridge constituted on the one hand by a fraction 21a of the secondary winding of a transformer 21 fed with an alternating voltage (at say 400 cycles) and by the winding 22 of an inductance coil adapted to be saturated and on the other hand by another fraction 21b of the secondary of the transformer 21 and by a resistance 23.

The saturation of the inductance coil 22 is performed through a control winding 24 in series in the circuit 6c—6d with a supply of direct current 25.

As concerns the energizing winding 26 of the motor, it is fed by the A.C. mains through the agency of a condenser 27 which ensures between the current $I_a$ in the winding 26 and the control current $I_b$ in the winding 19 the desired phase shifting by an amount equal to about 90°. Lastly, switches or contact-pieces 28a and 28b are provided in the circuit and the particular part played by the latter will be defined hereinafter.

The operation of this arrangement controlling the motor 8 is as follows: when the switch 6c—6d is open, the inductance coil 22 has a large impedance value and the alternating current conidered for instance at the moment at which it passes through a maximum value flows through the control winding 19 with a value $I_b$ in the direction of the arrow 29.

When, in contradistinction, the contact-pieces 6c—6d are in engagement with each other, current passes through the control winding 24 so that the impedance of the inductance coil 22 is reduced to a small value. The parts 21a and 21b of the transformer secondary are designed in a manner such that their voltages with reference to the point common to said parts are in phase opposition and the value of the resistance 23 is suitably selected so that the control winding 19 is fed by a current flowing against the direction of the arrow 29 and the value of which is 2 $I_b$ by considering solely the circuit $21_a$—$21_b$, 19.

Consequently, if the interaction between the circuits is negligible, the superposition of the current $I_b$ in the direction of the arrow 29 and of the current 2 $I_b$ in the opposite direction produces thus a total current of an intensity $I_b$ the direction of which opposes that of the current obtained when the contact pieces 6c—6d are disengaged.

Thus, the desired phase reversal has actually been obtained through the means disclosed together with a control of the system equilibrating the forces acting on the diaphragm 16.

However, this control may allow the current in the winding 19 controlling the motor and consequently the direction of rotation of the latter to be reversed systematically each time the contact-pieces 6c—6d move towards or away from each other. As a matter of fact, the system is never inoperative and the position of equilibrium obtained is constituted only by the mean position of the moving members. The characteristic curve showing the operation of the system would assume the shape illustrated at A—D in FIG. 4 or the reverse curve, said curve being drawn with the electromagnetic forces F in abscissae and the intensities $I_b$ in ordinates.

It is preferable to cut out the horizontal section B—C of said curve which corresponds to the oscillation area of the system described to either side of its position of equilibrium located at the origin O of the coordinates. In other words, it is necessary to give a linear shape to the response of said system.

I resort advantageously to this end to a feature of my invention according to which the diaphragm 16 is adapted to oscillate naturally to either side of its position of equilibrium as provided for instance by the wiring diagram illustrated in FIG. 5.

Said FIG. 5 reproduces a section of FIG. 3 between the switch including the contact-pieces 6c—6d and the secondary parts 21a—21b of the transformer 21 with however a slight difference in the showing. It is apparent that a further magnetizing coil 30 located on core 4 is fed in this case through the direct current side of a full wave rectifier-containing bridge 31 connected as illustrated across the terminals of the inductance coil 22, said coil 30 being shunted by a resistance 32 so as to adjust the intensity passing through it.

Under such conditions, when the switch 6c—6d is closed, current flows through said coil 30 and its action is such that it opens said switch and consequently the diaphragm and the parts associated therewith oscillate at a frequency approximating their natural frequency of oscillation. The phase of the current passing through the control winding 19 for the motor is a function of time $t$ and the curve defining it assumes therefore the appearance illustrated in FIG. 6 and the average action on the motor is zero by reason of the equality between the positive and negative phases of said current; therefore, the motor 8 and the slider 9 remain stationary when they have reached a predetermined position of equilibrium.

When said equilibrium is slightly broken, for instance as a consequence of a modification in pressure, the switch constituted by the contact-pieces 6c—6d has a tendency to close for instance during a period which is longer than that of its opening. The curve defining the phase of the current in the winding 19 is then that illustrated in dot and dash lines in FIG. 6 and the average value of the positive phase current has a larger action than that of the negative phase current. Taking into account the fact that the auxiliary mechanism has a frequency which is much lower than that of the movable system including the diaphragm, it acts as an integrator and follows the modifications of the average current.

Consequently, a disturbance of the equilibrium between the forces applied to the diaphragm leads to a continuous modification of the action of the motor, said modification being reversed furthermore with the direction of this disturbance of the equilibrium. The drawback produced by the presence of the horizontal section B—C in the curve of FIG. 4 is thus removed and it may be considered that the control follows a linear line as illustrated by the dot and dash line in FIG. 4.

I will now disclose, reference being made to FIGS. 7 and 8, an embodiment of my invention which removes the disturbing effect due to the hysteresis of the iron during the measure of the true air speed, which effect would prevent the current $i$ flowing in the magnetizing winding 3 from assuming with the desired approximation the value given hereinabove by the Equations A and B.

According to the arrangement considered, the disturbing effects of the hysteresis in the ferromagnetic core 4 of the pressure collector are cut out by forming in the circuit of the magnetizing coil 3 a short break at the beginning of each period corresponding to a change of substantial importance in the magnetizing current.

In a hysteresis cycle, such as that illustrated in FIG. 7, wherein the point E corresponds to maximum intensity I and to maximum inductance B, assuming the intensity is caused to decrease from its maximum down to its zero value, the conditions are those corresponding to the point F of the hysteresis cycle. If the intensity is then caused to increase again, the inductance value rises again up to the point E, said inductance following substantially the rectilinear line F—E which may define the curve of return of the iron and consequently the intensity I and inductance B are interconnected through a substantially linear relationship. If the inductance is then caused to pass again through the point F at each change of intensity of a certain importance, this linear relationship between I and B will remain true. For lesser reductions in the value of I such as that separating the points G1 and G2, the relationship between I and B remain substantially linear, as shown by the line connecting said points.

In order that the magnetic state of the circuit may be such that all the measures may be considered as executed with operative points located on the straight line F—E, I may resort advantageously to the arrangement illustrated in detail in the diagrammatic FIGURE 8. According to this arrangement, the speed reducing gear 33 which transmits to the slider 9 (FIG. 3) the movement of the motor 8 controls through the agency of a cam 34 the transient closing of a contact-piece 35 for the energization of a relay 36. It is apparent that under such conditions the latter will be actuated each time a modification by a certain minimum value of the current intensity $i$ is produced in the winding 3 since the modification in value of said current is performed through the movement of the speed reducing gear 33.

When the switch 35 closes, it provides for the discharge of a condenser 37 into the winding of the relay 36 so as to open during the peak of the discharge the contact-pieces 28a and 28b of the relay, which contact-pieces are shown in the circuit illustrated in FIG. 3, i.e. respectively in the circuit feeding the winding 3 and in the circuit energizing the motor. The short-lasting feed produced by the peak of the discharge of the condenser 27 returns thus the magnetic condition of the core 4 into that illustrated by the point F of FIG. 7 while the motor 8 ceases being energized during the short corresponding disturbance. It is furthermore preferable for the voltage produced in coil 36b by the rectifier bridge 38 which is fed in its turn through a transformer 39 to be insufficient for holding the armature 36a of relay 36 in its attracting condition in the case where the speed reducer 33 is held stationary in a position for which the switch 35 is closed. Thus, the contact-pieces 28a and 28b are only transiently shifted into their inoperative positions as required in the case considered. I have thus constituted an anti-hysteresis arrangement.

I will now describe briefly an arrangement for correcting the curve of the pressure measures, said arrangement being executed in accordance with my invention as applicable to the apparatus measuring true air speeds, i.e. the apparatus illustrated in FIG. 2.

Said curve has for its theoretical value according to the relationships (A) and (B):

$$i = K\sqrt{Pd}$$

This theoretical value which is a function of $Pd$ corresponds consequently to a straight line passing through the origin of the coordinate axes with a well-defined slope so that the pressure collectors may be interchangeable. But, in practice, on the one hand, said characteristic curve cannot normally pass through the origin of the axes as a consequence for instance of the remanent inductance illustrated by the point F of FIG. 7 and, on the other hand, the adjustment of the position of the contact-pieces 6c, 6d which might theoretically lead to an ideal characteristic would require a positioning of said contact-pieces with an accuracy within a few microns and this would be very difficult to obtain in practice. It is also preferable to obtain an approximately accurate characteristic curve within the possibilities and requirements of practice without any mechanical adjustment requiring such a micrometric accuracy, by obtaining first a rectilinear characteristic inside the utilization area without said rectilinear characteristic passing necessarily through the origin while its slope has a value smaller than that of the ideal characteristic; this being done, said rectilinear characteristic is shifted into the position corresponding to the theoretical characteristic and for this purpose, it is possible to introduce, through an auxiliary magnetizing coil, a suitable correction for the core 4 by means of a current of a suitable value obtained advantageously from the same supply U as for the coil 3 (FIG. 3), said current passing advantageously through an adjustable resistance.

I will now describe an arrangement forming part of my invention and relating to a correction due to the stagnation temperature. It has been shown hereinabove that such an arrangement may be necessary for the relationship E to be suitably satisfied. I will disclose hereinafter the manner of executing such an indicator of stagnation temperatures. The correction device imagined by myself consists in associating with the indicator of stagnation temperature, a repeating potentiometer the value of which is equal to R' and a stationary resistance having a value r. The whole arrangement forms a resistance varying as a function of the value of the stagnation temperature $T_0$ and it allows obtaining a rectilinear characteristic curve which replaces satisfactorily the slightly curved characteristic line which illustrates within the range of utilization the function:

$$\sqrt{T_0}=f(T_0)$$

In the case where a stagnation temperature indicator is not used, it is possible furthermore to constitute the resistance R' directly through the temperature gauging rod 14.

With these indications relating to said correcting arrangement for the stagnation temperature, I have ended the description of various details and improvements brought to the anemometer or the like apparatus for measuring the true air speed of the aircraft.

It has already been mentioned that the anemometer indicating the aerodynamic speed may, according to a further feature of my invention, be executed starting from the principle of the true air speed anemometer, as defined hereinabove in full detail. The true air speed is obtained starting from the Saint-Venant's formula written out as follows:

$$V=87.13\sqrt{T\left(\frac{Pd}{ps}+1\right)^{0.286}-T}$$

V being the speed in knots, T the static temperature, $Pd$ the dynamic pressure and $ps$ the static pressure, T having the standard value 288° K. while P has the value 1,013.25 mb.

Now, it has been shown that the current $i_a$ flowing through the winding 3a of FIG. 1 has for its value:

(A) $\qquad i_a = k\sqrt{Pd}$

Consequently, for measuring the aerodynamic speed, it is sufficient to measure the current $i_a$ obtained in the indicator of true air speeds according to the invention and it may be considered that the indicator of aerodynamic speeds is constituted merely by an indicator of dynamic pressures.

In order to measure the current $i_a$, it is possible to proceed as illustrated diagrammatically in FIG. 9; the latter shows in the first place the following elements, also shown in FIG. 1: the magnetizing winding 3a of the electromagnet and the controlled potentiometer 9a—10a controlling the intensity of the current $i_a$ flowing through said winding, while the arrangement IX of FIG. 1 is established in the manner shown with further detail, i.e. as follows: in the circuit of the magnetizing winding 3a is inserted a resistance 40 of an unvarying value, the voltage appearing across the terminals of which being thus a mere function of dynamic pressure.

This voltage is compared with the direct current reference voltage U$r$ through an automatic voltage divider. The latter is constituted in the case illustrated by a potentiometer 41, the slider 42 of which is controlled by a preferably two-phase motor 43 fed through the agency of a magnetic amplifier 44 fed in its turn by the direct current produced through the lack in balance in the connection 45 in which is inserted the winding 46 controlling said magnetic amplifier.

If the dynamic pressure varies, the value of the current $i_a$ is modified and consequently also the voltage to be measured across the terminals of the resistance 40. This leads to a lack of balance which produces a current in the winding 46 controlling the amplifier 44 so as to produce a rotation of the motor 43 in a direction such as will provide a return to balanced conditions. An indicator operatively connected with the motor shows the value of the aerodynamic speed.

Figure 9:
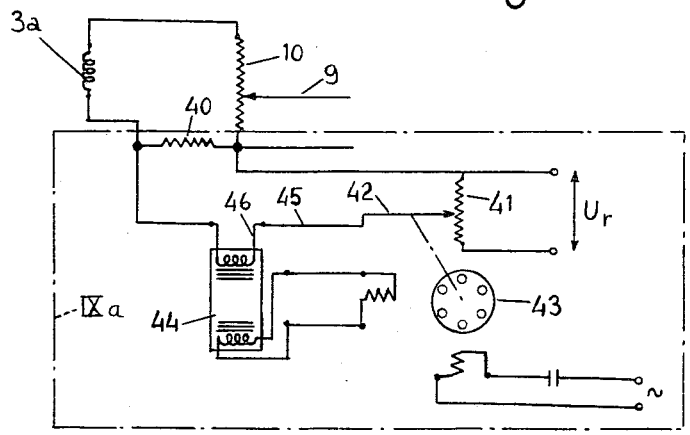

It is also possible to improve the arrangement of FIG. 9 with a view to distributing in a more advantageous manner the measuring indications given by the dial of the indicator, more specifically with a view to increasing the accuracy of the indications at low speeds corresponding to landing or to taking off.

Figure 10:
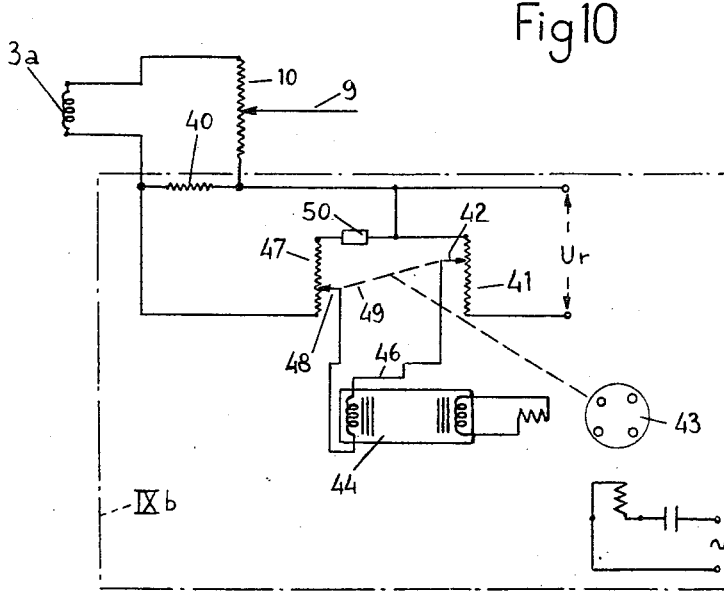
FIG. 10 is a corresponding diagram of an improved embodiment.

Said improvement leads to producing an electric mathematical transformation between the aerodynamic speed detected by said apparatus and the final speed indicator. This is illustrated in the diagram of FIG. 10 where the arrangement IX of FIG. 1 is executed as shown in the section IX$b$ of FIG. 10. The arrangement illustrated in FIG. 10 includes in addition to the elements of FIG. 9 a potentiometer 47 inserted in parallel with the resistance 40 and the slider 48 of which is connected mechanically through a linkage 49 with the slider 42 of the potentiometer 41. Said slider 42 is positioned in a manner such that for an aerodynamic speed equal to zero, said slider is at the lower end of the potentiometer 47. Consequently, as the dynamic pressure P$d$ increases, the voltage detected by the magnetic amplifier 44 decreases and reaches for the maximum value foreseen for the apparatus, say 700 knots, a suitable value defined by the value of a constant resistance 50 provided to this end.

I will now disclose how it is possible to establish a Machmeter according to my invention, said Machmeter being preferably executed starting from the embodiment of an indicator of true air speeds as described with reference to FIG. 2 and to FIGS. 3 to 7.

A usual expression of the Mach member M as a function of the dynamic pressure P$d$ and of the static pressure $ps$ is:

$$M=\sqrt{k\left(\frac{Pd}{ps}+1\right)^{k'}-k}$$

$k$ and $k'$ being constant coefficients which are independent of the other coefficients also referred to hereinabove.

The Mach number is thus a function of the square root of the ratio $$\frac{Pd}{ps}$$

Abacuses are available for giving a graphic illustration of said function such as the United States document MIL–C–5146. These abacuses show that the curve $$M=f\left(\frac{Pd}{ps}\right)$$

approximates a straight line. Consequently, it is sufficient to translate electrically the function $$\frac{Pd}{ps}$$

so that the corresponding indications obtained on the dial may be practically linear. At any rate, an easy mathematical transformation associated with the electric circuits allows returning to a linear or the like relationship as required for a further transmission or for a remote control.

Now, in the diagrams illustrated in FIGS. 1 and 2, there exist already two controlled circuits, to wit those of the windings 3a and 3b in each of which flows a current forming respectively the square root of P$d$ and the square root of $ps$ after multiplication by a constant factor. In conformity with the present embodiment of the invention, I measure consequently the Mach number by forming the quotient of these two currents while taking care not to disturb the circuits of the anemometer of true air speeds.

It is of advantage to form this quotient through the agency of an arrangement inserted at XI (FIG. 1) and shown in detail in FIG. 11. Said arrangement includes a magnetic amplifier 51 (FIG. 11), the control winding of which includes two separate coils 52 and 53 in which flow currents proportional respectively to the square roots of P$d$ and $ps$, said currents being tapped off the circuits of the magnetic windings 3a and 3b.

The magnetic amplifier 51 controls through a circuit 54 the rotation of a motor 55 which is advantageously a two-phase motor. The circuits are designed furthermore in a manner such that they provide for equality between the ampere-turns produced in each of the input windings 52 and 53 of the amplifier, as required for obtaining a position of the slider 56a corresponding to the Mach number, by currents proportional to the square roots of the static and dynamic pressures.

It is necessary also for the tapping off of the current intended for feeding the coil 52 not to exert a detrimental action on the efficiency of the temperature-sensitive correcting system used in the means calculating the true air speed. It is therefore necessary for the circuit measuring the Mach number which is fed through a tapping from the coil 3a to show a practically constant resistance. Since said circuit includes a potentiometer 56 the location of the slider 56a of which defines the value of the Mach number through a connection with the control motor 55, it is necessary to insert in series therein a large resistance 57. The current tapped off the winding 3b is tapped off across the terminals of a further resistance 58.

Under such conditions, it is possible to express the value of the current in the resistances of the control windings 52 and 53 of the magnetic amplifier; taking into account the fact that the resistance 57 is very large with reference to the resistance 56 and to the resistance of the winding 52 and by expressing equality between the ampere-turns obtained in the windings 52 and 53, it is found that the angular position of the slider 56a on the potentiometer 56 corresponds when equilibrium is obtained to the actual value of the Mach number. The latter may thus be obtained through an indicator connected mechanically with said slider or else in an equivalent manner with the motor 55.

The reading dial on the indicator of Mach number the scale of which begins only normally at 0.6, may advantageously be positioned in an empty area of the dial indicating the aerodynamic speeds, for instance the area extending between the maximum and minimum figures provided on the latter (say between 700 and 80 knots).

I will now disclose how it is possible to establish in accordance with my invention an apparatus for measuring the stagnation temperatures, said apparatus forming a third indicator inserted preferably beyond the anemometer indicating the aerodynamic speed and the Mach meter and associated with the anemometer indicating the true air speeds which is designed in the manner disclosed hereinabove. It has been mentioned as a matter of fact that the anemometer indicating aerodynamic speeds was advantageously associated with means for correcting the disturbances due to the stagnation temperature which requires consequently for the said temperature to be at least implicitly measured by the apparatus.

This measuring of the stagnation temperature is performed advantageously starting from the gauging rod 14 shown in FIG. 1, through the agency of the arrangement XII which is shown in detail in FIG. 12. The gauging rod 14 is constituted preferably by a platinum resistance embedded inside a glass the heat expansion coefficient of which is substantially zero. Said gauging rod forms one of the four arms of a Wheatstone bridge of which the three other arms are constituted by the resistances 59a, 59b, 59c which are stable whatever may be the modifications in temperature. A potentiometer 60 provided with a slider 61 allows equilibrating the bridge which is fed furthermore by D.C. obtained through A.C. mains and a full wave rectifier bridge system 62. The slider 61 is controlled by a motor 63 which is preferably constituted by a two-phase induction motor the rotation of which is ensured through the lack of balance in the output circuit of a magnetic amplifier 64 the input circuit 65 of which is inserted in the measuring diagonal controlling the balancing of the bridge.

The slider 61 is controlled by a motor 63 constituted preferably by a two-phase induction motor which starts rotating under the action of the lack of balance produced through the output of the magnetic amplifier 64, the input circuit 65 of which is inserted in the measuring diagonal of the bridge and is sensitive to any lack of balance in the latter. When the bridge is balanced, the motor 63 stops. The position of the slider 61 characterizes then the state of equilibrium and consequently the value of the temperature acting on the gauging rod 14.

Such an arrangement for measuring the stagnation temperature may be provided with various improvements.

One of said improvements provides for a convenient distribution of the temperature indications ranging between say −20° C. and +150° C. over an arc of a reading dial, say, an arc of 350° through the agency of a resistance 66 which allows modifying the value of the potentiometer 60.

A further improvement consists in distributing the graduations of the scale according to a linear law by producing a slight electric mathematical transformation through a resistance 67 so as to take into account the fact that the variations of the resistance of the gauging rod 14 throughout the range of operation do not follow a linear law.

A third improvement is adapted to prevent the resistances in the line arising possibly through the distance between the gauging rod and the remainder of the apparatus from disturbing the gauging of the instrument. This third improvement consists in providing compensation wires such as 68.

On the other hand, it has been mentioned hereinabove that the apparatus may include advantageously a repetition potentiometer which is not illustrated and operates as a rheostat so as to provide for the corrections due to temperature, which is necessary for the proper calculation of the true air speed.

The four measuring apparatus which have thus been described and which are advantageously illustrated in FIG. 1 forming the core of the arrangement constituted by the anemometer indicating the true air speeds may also be improved in various manners.

Thus, in addition to the potentiometer or potentiometers or the like control members, each instrument or indicator may incorporate one or more members or arrangements for remote further transmission. These arrangements are advantageously constituted by one or more potentiometers 69 (FIGS. 1 and 13) which are mounted on the same shaft as the measuring potentiometer such for instance as 10a or 56 and by resorting to a diagram XIII of the type illustrated in detail in FIG. 13. This arrangement forms a conventional Wheatstone bridge arrangement including a further potentiometer 70 at a distance, said potentiometer constituting a repeating potentiometer. The whole arrangement is fed through a supply of direct current 71 such as a storage battery. The two sliders 72 and 73 on the potentiometers 69 and 70 are electrically interconnected through a wire forming the measuring diagonal of the bridge, in which wire is inserted the energizing circuit 74 of a magnetic amplifier 75. The output circuit 76 of the latter starts the motor 77 which rotates in the suitable direction to control the slider 73 as soon as a lack of equilibrium appears in the bridge. When, in contradistinction, the bridge is balanced, the motor 77 remains stationary and the two sliders occupy homologous positions. Several sets of transmitter and receiver potentiometers similar to 69—70 may furthermore be provided for instance for producing remote control and indicating devices.

I obtain thus, whatever may be the embodiments and the applications considered, means for measuring data, and especially the true air speed of flying aircraft. My invention covers generally all methods, arrangements and apparatus disclosed hereinabove and claimed in accompanying claims without any restrictive clause as to their embodiments and applications. They show furthermore numerous advantages resulting from their mechanical resistance, the accuracy obtained therewith, the fact that they allow producing a compound arrangement of the four indicator instruments which have been more particularly described, said arrangement having a small weight and a reduced bulk, and from the fact that they may be easily adapted for remote transmission.

Among the various modifications of my invention falling within the scope of the accompanying claims, I may mention for instance an altimeter for aircrafts relying on the measure of static pressures and any other instruments or apparatus other than the four instruments which have been more particularly described and which may incorporate various features claimed in the accompanying claims.

What I claim is:

1. Apparatus for measuring the true air speed of an aircraft during flight in dependence upon static pressure, dynamic pressure and temperature, said apparatus including a true air speed indicator, two pressure collectors each including a yielding diaphragm subjected respectively to dynamic pressure and to static pressure and a magnetic armature operatively connected with the diaphragm of each pressure collector for movement therewith, an electric control circuit for each collector, an electric contact-maker in each control circuit comprising a stationary contact and a movable contact operatively connected with the diaphragm for movement therewith, an electromagnetic circuit associated with each pressure collector, each electromagnetic circuit including a part inductively coupled with the corresponding armature and each including an impedance and an adjusting member cooperating with said impedance, an electric control motor in each control circuit operatively connected to the impedance adjusting member of the corresponding electromagnetic circuit, a source of voltage feeding the impedance of electromagnetic circuit of the static pressure collector, means connecting the adjusting members of the two electromagnetic circuits whereby the current in said last-mentioned electromagnetic circuit feeds the electromagnetic circuit of the dynamic pressure collector, a variable electric resistance in one of the electromagnetic circuits in parallel with the inductively coupled part thereof, temperature-responsive means for reducing said resistance as the temperature increases, the control motor in the electric circuit of each pressure collector being rotatable in one direction or the other in response to the making and breaking of the corresponding contacts and means operatively connecting at least one of said motors to said speed indicator.

2. Apparatus for measuring the true air speed of an aircraft during flight in dependence upon static pressure, dynamic pressure and temperature, said apparatus including a true air speed indicator, two pressure collectors each including a yielding diaphragm subjected respectively to dynamic pressure and to static pressure and a magnetic armature operatively connected with the diaphragm of each pressure collector for movement therewith, an electric control circuit for each collector, an electric contact-maker in each control circuit comprising a stationary contact and a movable contact operatively connected with the diaphragm for movement therewith, an electromagnetic circuit associated with each pressure collector, each electromagnetic circuit including a part inductively coupled with the corresponding armature and each including a potentiometer, a slider cooperating with said potentiometer, an electric control motor in each control circuit operatively connected to the slider of the corresponding electromagnetic circuit, a source of voltage feeding the impedance of electromagnetic circuit of the static pressure collector, means connecting the sliders of the two electromagnetic circuits whereby the current in said last-mentioned electromagnetic circuit feeds the electromagnetic circuit of the dynamic pressure collector, a variable electric resistance in one of the electromagnetic circuits in parallel with the inductively coupled part thereof, temperature-responsive means for reducing said resistance as the temperature increases, the control motor in the electric circuit of each pressure collector being rotatable in one direction or the other in response to the making and breaking of the corresponding contacts and means operatively connecting at least one of said motors to said speed indicator.

3. Apparatus for measuring the true air speed of an aircraft during flight and adapted to indicate the true air speed V by the expression $$V = n\sqrt{\frac{Pd}{ps}}\sqrt{T_0}$$

$n$ being a constant factor, $Pd$ the dynamic pressure, $ps$ the static pressure and $T_0$ the stagnation temperature, said apparatus including a true air speed indicator, two pressure collectors each including a yielding diaphragm subjected respectively to dynamic pressure and to static pressure and a magnetic armature operatively connected with the diaphragm of each pressure collector for movement therewith, an electric control circuit for each collector, an electric contact-maker in each control circuit comprising a stationary contact and a movable contact operatively connected with the diaphragm for movement therewith, an electromagnetic circuit associated with each pressure collector, each electromagnetic circuit including a part inductively coupled with the corresponding armature and each including a potentiometer, a slider cooperating with said potentiometer, an electric control motor in each control circuit operatively connected to the slider of the corresponding electromagnetic circuit, a source of voltage feeding the impedance of electromagnetic circuit of the static pressure collector, means connecting the sliders of the two electromagnetic circuits whereby the current in said last-mentioned electromagnetic circuit feeds the electromagnetic circuit of the dynamic pressure collector, a variable electric resistance in one of the electromagnetic circuits in parallel with the inductively coupled part thereof, stagnation temperature-responsive means for reducing said resistance as the temperature increases, a constant resistance in series with said variable resistance of such value that $$\sqrt{T_0} = n'\frac{r}{r+R'}$$

where $T_0$ is the stagnation temperature, $n'$ is a constant, $r$ is the resistance of the constant resistance, and $R'$ is the value of the variable resistance, the control motor in the electric circuit of each pressure collector being rotatable in one direction or the other in response to the making and breaking of the corresponding contacts and means operatively connecting at least one of said motors to said speed indicator.

4. An apparatus for measuring the Mach number for an aircraft during flight in dependence on static pressure, dynamic pressure and stagnation temperature, said apparatus comprising an indicator for expressing said Mach number, two pressure collectors each including a yielding diaphragm subjected respectively to dynamic pressure and to static pressure and a magnetic armature operatively connected with the diaphragm of each pressure collector for movement therewith, an electric control circuit for each collector, an electric contact-maker in each control circuit comprising a stationary contact and a movable contact operatively connected with the diaphragm for movement therewith, an electromagnetic circuit associated with each pressure collector, each electromagnetic circuit including a part inductively coupled with the corresponding armature and each including an impedance and an adjusting member cooperating with said impedance, an electric control motor in each control circuit operatively connected to the impedance adjusting member of the corresponding electromagnetic circuit, a source of voltage feeding the impedance of electromagnetic circuit of the static pressure collector, means connecting the adjusting members of the two electromagnetic circuits whereby the current in said last-mentioned electromagnetic circuit feeds the electromagnetic circuit of the dynamic pressure collector, a variable electric resistance in one of the electromagnetic circuits in parallel with the inductively coupled part thereof, stagnation temperature-responsive means for reducing said resistance as the temperature increases, the control motor in the electric circuit of each pressure collector being rotatable in one direction or the other in response to the making and breaking of the corresponding contacts, a third electric control motor having a controlling winding, a magnetic amplifier connected to said controlling winding and having two control windings, means connecting each of the control windings to one of said inductively coupled parts, a potentiometer in one of said last connecting means for varying the resistance thereof, said potentiometer having a slider, and means operatively connecting said last slider with the third electric motor and with the indicator.

5. Apparatus for measuring the true air speed of an aircraft during flight in dependance upon static pressure, dynamic pressure and temperature, said apparatus including a true air speed indicator, two pressure collectors each including a yielding diaphragm subjected respectively to dynamic pressure and to static pressure and a magnetic armature operatively connected with the diaphragm of each pressure collector for movement therewith, an electric control circuit for each collector, an electric contact-maker in each control circuit comprising a stationary contact and a movable contact operatively connected with the diaphragm for movement therewith, an electromagnetic circuit associated with each pressure collector, each electromagnetic circuit including a part inductively coupled with the corresponding armature and each including a potentiometer, a slider cooperating with said potentiometer, an electric control motor in each control circuit operatively connected to the slider of the corresponding electromagnetic circuit, a source of voltage feeding the impedance of the electromagnetic circuit of the static pressure collector, means connecting the sliders of the two electromagnetic circuits whereby the current in said last-mentioned electromagnetic circuit feeds the electromagnetic circuit of the dynamic pressure collector, the electromagnetic circuit of at least one of said collectors further including a switch, means operatively connected with the motor controlling the corresponding slider to produce the opening of said switch during a brief period, a variable electric resistance in one of the electromagnetic circuits in parallel with the inductively coupled part thereof, temperature-responsive means for reducing said resistance as the temperature increases, the control motor in the electric circuit of each pressure collector being rotatable in one direction or the other in response to the making and breaking of the corresponding contacts and means operatively connecting at least one of said motors to said speed indicator.

6. Apparatus for measuring the true air speed of an aircraft during flight in dependance upon static pressure, dynamic pressure and temperature, said apparatus including a true air speed indicator, two pressure collectors each including a yielding diaphragm subjected respectively to dynamic pressure and to static pressure and a magnetic armature operatively connected with the diaphragm of each pressure collector for movement therewith, an electric control circuit for each collector, an electric contact-maker in each control circuit comprising a stationary contact and a movable contact operatively connected with the diaphragm for movement therewith, an electromagnetic circuit associated with each pressure collector, each electromagnetic circuit including a part inductively coupled with the corresponding armature and each including a potentiometer, a slider cooperating with said potentiometer, an electric control motor in each control circuit operatively connected to the slider of the corresponding electromagnetic circuit, a source of voltage feeding the impedance of the electromagnetic circuit of the static pressure collector, means connecting the sliders of the two electromagnetic circuits whereby the current in said last-mentioned electromagnetic circuit feeds the electromagnetic circuit of the dynamic pressure collector, the electromagnetic circuit of at least one of said collectors further including a coil, and means for feeding a supplementary correcting current through said coil, a variable electric resistance in one of the electromagnetic circuits in parallel with the inductively coupled part thereof, temperature-responsive means for reducing said resistance as the temperature increases, the control motor in the electric circuit of each pressure collector being rotatable in one direction or the other in response to the making and breaking of the corresponding contacts and means operatively connecting at least one of said motors to said speed indicator.

References Cited in the file of this patent

UNITED STATES PATENTS

| | | |
|---|---|---|
| 2,318,153 | Gilson | May 4, 1943 |
| 2,457,287 | Townes | Dec. 28, 1948 |
| 2,537,580 | Garnier | Jan. 9, 1951 |
| 2,574,656 | Peterson | Nov. 13, 1951 |
| 2,751,786 | Coulbourn et al. | June 26, 1956 |

FOREIGN PATENTS

| | | |
|---|---|---|
| 996,669 | France | Sept. 5, 1951 |
| 689,066 | Great Britain | Mar. 18, 1953 |